United States Patent [19]

Iwasaki et al.

[11] 3,775,212

[45] Nov. 27, 1973

[54] PROCESS FOR PRODUCING ORNAMENTAL COATING MATERIAL HAVING CONCAVO-CONVEX PATTERNS

[75] Inventors: Hajime Iwasaki; Teiichi Shimizu; Seiko Sakakura, all of Tokyo, Japan

[73] Assignee: Mitsuboshi Sangyo Kabushiki Kaisha, Chiyoda-ku, Tokyo, Japan

[22] Filed: Sept. 20, 1971

[21] Appl. No.: 182,269

[30] Foreign Application Priority Data
Sept. 26, 1970 Japan.............................. 45/84410

[52] U.S. Cl.................... 156/220, 117/8, 117/10, 117/41, 156/163, 156/324, 156/183, 161/117, 161/411, 161/DIG. 3, 264/345
[51] Int. Cl......................... B32b 31/20, B32b 3/00
[58] Field of Search...................... 117/8, 10, 37 R, 117/41; 156/163, 164, 183, 196, 209, 220, 324; 161/117, 411, DIG. 3; 264/214, 345

[56] References Cited
UNITED STATES PATENTS

| | | | |
|---|---|---|---|
| 2,897,109 | 7/1959 | Voigtman | 156/164 X |
| 3,231,654 | 1/1966 | Finger | 264/261 |
| 3,281,257 | 10/1966 | Rosen | 117/10 |

Primary Examiner—Alfred L. Leavitt
Assistant Examiner—Robert A. Dawson
Attorney—Albert H. Oldham

[57] ABSTRACT

The invention relates in a process for manufacturing an ornamental coating material having new concavo-convex patterns by means of the application of internal stress generated within the thermoplastic resin sheet by passing the sheet through between two rolls having different temperatures without using an expensive embossing roll.

5 Claims, No Drawings

PROCESS FOR PRODUCING ORNAMENTAL COATING MATERIAL HAVING CONCAVO-CONVEX PATTERNS

This invention relates to a process for producing an ornamental coating material having unique concavo-convex figures or patterns using the simple procedure and simple apparatus by means of taking advantages of thermal stresses produced in a thermoplastic resin.

Hitherto, the ornamental coating material, such as a wall paper having concavo-convex figure on the surface thereof, has been produced by melting the thermoplastic resin sheet on a backing material using a heated embossing calender roll. In order to effect the above process, however, it is necessary to employ a rather expensive embossing calender roll and to alter the roll according to the sort of the pattern desired. In addition, the patterns embossed on the coating material have not sufficient engraving appearance.

On the other hand, it has been proposed a process for producing the coating material by cutting the thermoplastic resin sheet to make pellets, swelling, scattering them on the backing material, and then passing the backing material through the calender rolls without using any intensive pressure to give concavo-convex figure to the coating material. According to the process, it does not need to use the embossing calender roll but it is disadvantage to by-produce fine powders during the procedure, and to use a swelling solution during the operation thereby causing trouble about the workability and environmental hygiene. Said process makes the continuous process for manufacturing the coating material difficult, and also the sorts of pattern to be embossed are limited. Consequently, this process has many problems to be improved in respect with the above points.

In view of the above facts, the inventors of the present process have studied the different methods using the calender roll and found out a very simple process wherein a desired ornamental coating material can be obtained by passing the thermoplastic resin sheet between two heated rolls having different temperature range to give internal strain thereto, and heat-treating the sheet to set the concavo-convex figure the sheet being carried by a backing material.

The gist of the present process for producing the ornamental coating material having concavo-convex figure is characterized by supplying the thermoplastic resin sheet or the thermoplastic resin composition capable of making a sheet, by passing through a heated roll, applying the sheet on the backing material which is not deformed at a temperature higher than the softening point of said resin composition, passing the backing material and resin sheet through two rolls, the one of which contacting the backing material being heated at a temperature higher than the softening point of the resin composition and the other of which contacting the resin composition being heated at a temperature lower than the softening point of the resin composition by 20°C, and then heating the backing material at a temperature between that of the softening point of the resin composition and that lower than the softening point of the resin composition by 20°C to produce the ornamental coating material having concavo-convex figure.

The present invention will be clearly explained by means of the following embodiment. At first, the sheet is produced as usual from a thermosplastic resin compound having added auxiliary agents such as pigments and the like. Said sheet obtained is laminated with a backing material such as kraft paper, and then the backing material is sent between the two heated rolls. At this time, the two rolls should have such different temperatures that the roll contacted with the backing material (hereinafter this roll will be called as "the lower roll") has a higher temperature and the other roll contacted with the resin sheet (hereinafter this roll will be called as "the upper roll") has a lower temperature. The temperature is determined optionally according to the softening point of the resin sheet and thus the temperature of the upper roll is set at 60°~110°C and that of the lower roll is set at 140°~200°C, for example. The resin sheet sent to the heated rolls incurs shearing stress by the temperature differences of the rolls and the rolling pressure thereby causing internal strains which are different between the upper layer portion of the resin sheet and the lower layer portion of the sheet due to the difference of the temperatures between the two rolls. The setting up of the internal stress is deduced to be due to the gradient of fluid viscosity in a fluidized layer comprising a plastic flow area and viscus flow area owing to heat-transferring from rolls to the sheet. The internal strains have a tendency to decrease toward the lower layer of the resin sheet from the upper layer thereof, thereby giving cracks within the resin sheet. When the internal strain becomes extremely large, the cracks develop to breaking strain through the permanent breaking phenomenon. The breaking phenomenon varies according to the temperature and the deformation rate, the first step is the process for the crack core formation, the speed for forming cracks is rather lower and varies according to the lapse of time. At this step, the speed for forming cracks is affected by the thermal kinetics of the molecule.

The growing speed of cracks in the process for forming cracks is remarkably large. At this step, the progress of the cracks is affected by the temperature and the higher the temperature is, the more the formation of the cracks proceeds. The internal strains are completely removed by means of the secondary heating whereby the shrinkage of the product can be prevented. The temperature for the heat-treatment is generally set on the temperature of 120°~160°C due to the softening point of the resin sheet used. Thus, the resin sheet is secured to the backing material to give an elegant ornamental coating material having a crack-like concavo-convex patterns.

The thermoplastic resin used as the starting material of the present process comprises for example polyvinyl chloride (PVC), its copolymers, polyethylene, polypropylene, polystyrene, ethylene-vinyl acetate copolymer and the like. Among them, soft PVC and its copolymers are the most suitable material therefor.

To these resins, plasticizers, fillers, stabilizers, pigments, foaming agents, antistatic agents, slipping agents and the like are optionally added to prepare a compound to be treated.

The resin material is supplied on the backing material to mold to the sheet according to the usual manner. The thermoplastic resin compound may be pre-heated to make a mass or be extruded to make a segment by an extruder and then fed on the backing material to make a sheet by means of the heated roll or a paste resin may be applied on the backing material, heated to make a gel and thereafter passed through or over the heated roll to give the sheet. Anyway, it is necessary to put the resin on the backing material in the form capable of feeding it to the heated roll continuously and to mold to the sheet after passing through the heated rolls.

When the temperature of the pre-heating becomes higher than the softening point of the resin composition, the fluidity of the resin composition becomes good resulting in decreasing its internal strains and making it difficult to obtain cracked figures. Accordingly, if it is necessary to carry out pre-heating, the temperature of the pre-heating should be as low as possible in the extent of obtaining the fluidity of the resin composition for the continuous supply on the backing material.

As for the backing material, a sheet-like material not deforming at a temperature higher than the softening point of the resin composition used, for example, paper such as kraft paper, Japanese paper, various kinds of textiles, non-woven fabric, metallic foil, synthetic resin sheet and the like can be used.

For a heated roll, common calender rolls (two or more) as well as embossing calender rolls or another type of rolls may be used, if necessary.

It is important to set the temperature conditions of the upper and lower rolls heated in the practice of the present invention. The temperature of the lower roll should be set so as to soft melt the resin sheet and adhere the resin sheet on the backing material that is at a temperature higher than the softening point of the resin composition. However, when it is too high, the viscosity gradient in the sheet layer would not appear whereby cracks would not be formed. Accordingly, the temperature of the lower roll should be selected in the range from the temperature of the softening point of the resin composition to a temperature higher than the softening point thereof by 50°~60°C. The temperature of the lower roll, in case of for example polyvinyl chloride, may be about 140°~220°C.

On the other hand, the temperature of the upper roll should be set at a temperature lower than the softening point of the resin composition by about 20°C. When the temperature is elevated furthermore, it is not preferable since not only the difference of strains between the upper layer and the lower layer of the resin sheet becomes smaller, but also the resin sheet separates from the backing material by adhering the sheet to the upper roll. The lower limit of the temperature of the upper roll should be set in such extent as it is controllable in view of the industrial operation, that is, the temperature higher than an ambient temperature by about 20°C. In case of using the sheet of polyvinyl chloride, the suitable temperature of the upper roll is for example, 60° to 130°C. When the temperatures of the upper and lower rolls are set as mentioned above, the temperature of the lower roll follows the temperature higher than that of the upper roll as a natural consequence. The difference of the temperature has influences on the condition of the occurence of strains, that is, the formation of cracks and hence it is suitable to set the temperature gradient on about 60°~120°C to obtain the desired figures or patterns.

The interrelation-ship between the thickness of the sheet and the space between the upper and lower rolls will be hereinafter illustrated.

The thickness of the sheet is preferable to 0.8~10.0 mm. The sheet is preferable to be of a thickness not less than 0.8 mm because, in case that the thickness of sheet is less than 0.8 mm, the transmission of heat is so rapid as be difficult to generate internal strains within the sheet whereby cracks will not be formed. It is possible to use a sheet having the thickness higher than 10 mm by pre-heating it, but is desirable to use the sheet having the thickness lower than 10 mm. The space between the upper and the lower rolls is preferably that of the range from 0.2 to 1.5 mm. When the space is set less than 0.2 mm, internal strains would not generate in a thin sheet. While in the case that a thicker sheet than that of said range is used, it is not satisfactory by the reason that the portion of sheet adjacent to the lower roll begins to melt and then adhere to the backing material, whereby the desired pattern does not appear. On the other hand, when the space between the two rolls becomes larger than 1.5 mm, the transmission of heat across the sheet tends to be insufficient resulting in broadening the difference of strain between the upper layer and the lower layer whereby only shrinkage will generate without any cracks.

As a result of various examinations under the conditions hereinbefore, it has been found that good results are obtained by adjusting the compressive ratio of roll space to for example 3~30.

In conclusion, the following conditions are shown in the practice of the present invention.

$$0.8 \leq t \leq 10.0 \text{ (mm)},$$
$$0.2 \leq d \leq 1.5 \text{ (mm)},$$
$$3 < c < 30$$

Note:
$t$ : thickness of sheet
$d$ : space between rolls
$t/d = c$ : compressive ratio The size and depth of cracks in the concavo-convex patterns will be changed by selecting the said conditions.

The selectivity of coarse or fine crack patterns may depend upon the rotary speed of the rolls and the temperature of the sheet to be fed. Namely, the more the rotation of the rolls increases, the more the crack patterns become coarse, the higher the feeding temeperature of the sheet rises, the more the crack patterns become fine.

The sheet adhered on the backing material and provided with crack patterns on the surface thereof is then passed through a heating furnace to remove the internal strains.

It is necessary to adjust the temperature of the furnace in the range between the temperature lower than the softening point of the resin sheet by about 20°C and the temperature of the softening point thereof. The internal strain cannot be removed thoroughly when the temperature of the furnace is lower than the lower range of above temperature range because the occurrence of cracks tends to be delayed. In consideration of the rate of crack generation, the higher the heating temperature of the furnace, the more the internal strain is removed, therefore, it is preferable to select the temperature of furnace to a rather higher temperature. However, when the temperature is set to a temperature higher than the melting point of the resin sheet, the resin is apt to melt on the surface of the sheet or to suffer by heat deterioration. Therefore it is preferable to set the heating temperature to one lower than the melting point of the sheet. The retention time of the resin sheet in the furnace is about 20 seconds or more.

According to the process of the present invention, various combinations of sorts of resin sheet, the conditions of feeding thereof, sorts of backing material, the temperature of heated rolls, the difference of the temperatures between the upper and lower rolls, thickness of the sheet, space between two rolls, temperature of the furnace, working conditions, and the like will produce the ornamental coating material having various sorts of concavo-convex patterns. The characteristic features of the present invention, will be summarised as follows:

a. Concavo-convex patterns can be obtained by using the common calender roll without using rather expensive embossing calender roll.

b. Coating materials having various patterns can be produced by the same installation, without changing the rolls according to the sort of the patterns desired.

c. The patterns obtained according to the present invention possess such characteristic as random, delicate, sculptural, and complicated patterns, that can hardly be obtained by using an embossing calender roll.

d. An excellent result can be obtained by "valley print" (embossing print by valley dyeing) (see Example 2).

e. The installation suitable for accomplishing the process of the present invention is simple and the operation is easy, too, therefore, the cost of equipment and labour fee are rather inexpensive.

f. The process of this invention will be able to be carried out continuously.

g. Color and the size or depth of the patterns can be optionally adjustable.

h. There are no environmental difficulties for the present process because the formation of fine particles of resin compositions as well as gas evolution from swelling agents does not occur.

The coating material obtained can be used for interior decorations such as, for ceilings and walls.

The following examples illustrate the present invention. In the Examples, the compounding of the material compounds and pigments employed therein are as follows:

| Compounding A | Parts (by weight) |
| --- | --- |
| Vinylchloride-vinylacetate copolymer ($\bar{P}$ 650 VAC 5 %) | 100 |
| Plasticizer (DOP : BBP : TCEP 8 : 4 : 3) | 45 |
| Flame retarder (chlorinated paraffin : $Sb_2O_3$ 1:1) | 20 |
| Filler ($CaCO_3$) | 50 |
| Stabilizer | 5 |
| Pigments | 4 |
| Compounding B | |
| Vinylchloride-vinylacetate copolymer ($\bar{P}$ 900 VAC 3%) | 100 |
| Plasticizer (DOP : BBP : TCEP 8 : 4 : 3) | 45 |
| Filler ($CaCO_3$) | 50 |
| Flame retarder (chlorinated paraffin : $Sb_2O_3$ 1:1) | 20 |
| Stabilizer | 5 |
| Foaming agent | 5 |
| Pigments | 4 |
| Compounding C | |
| Polyvinylchloride ($\bar{P}$ 1000) | 100 |
| Plasticizer (DOP : BBP : TCEP 8 : 4 : 3) | 45 |
| Flame retarder (chlorinated paraffin : $Sb_2O_3$ 1:1) | 20 |
| Filler ($CaCO_3$) | 50 |
| Stabilizer | 5 |
| Pigments | 4 |
| Compounding D | |
| Vinylchloride-ethylene-vinylacetate copolymer ($\bar{P}$ 600 EVAC 8%) | 100 |
| Plasticizer (DOP : BBP : TCEP 8 : 4 : 3) | 45 |
| Filler ($CaCO_3$) | 50 |
| Flame retarder (chlorinated paraffin : $Sb_2O_3$ 1:1) | 20 |
| Stabilizer | 5 |
| Pigments | 4 |
| Compound E | |
| Polyvinylchloride (paste resin) ($\bar{P}$ 1200) | 100 |
| Plasticizer (DOP) | 80 |
| Filler ($CaCO_3$) | 30 |
| Stabilizer | 5 |
| Pigments | 4 |
| Compounding F (pigment) | |
| Titanium white | 3.0 |
| Cadmium yellow | 0.1 |
| Lead oxide | 0.1 |
| Compounding G (pigment) | |
| Titanium white | 3.0 |
| Cadmium yellow | 0.3 |
| Carbon Black | 0.01 |

EXAMPLE 1

The compound A is blended by the mixing roll and sent to the calender roll to make the sheet of 2.0 mm in thickness. The sheet obtained is applied on the kraft paper passing through two heated rolls, wherein the temperature of the lower roll is maintained at 160°C and that of the upper roll is maintained at 80°C. Internal strain generates within the sheet passing through between the two heated rolls having the compressive ratio of 4 and the space of 0.5mm in thickness. The sheet is then passed through an oven kept at 140°C for 20 seconds to give crack patterns on the surface of the sheet resulting and to completely remove the internal strains therefrom.

In this case, varied crack patterns can be produced by selecting the thickness of the sheet, and the crack patterns are superior than that obtained by using the embossing calender roll in respect to depth, random positioning and complexity.

EXAMPLE 2

To 100 parts of the compound A (except 4 parts of the pigment), two kinds of the compounds F and G, both of which are the pigment, are compounded respectively and mixed to give the compounds F' and G'. The sheet having the thickness of 1.0 mm is produced from the compound F' by means of the calender roll. On the other hand, another sheet having the thickness of 1.0 mm is produced similarly from the compound G'. When the sheet of the compound G' enters to the last roll, the former sheet of the compound F' is piled up and both of which are simultaneously passed through the last roll. The sheet having two different color layers obtained, is applied on the kraft paper, and the crack patters can be obtained by treating according to the process of example 1. The patterns obtained have the advantages of superior printing effects in comparison with a vallay print and of being good in depth and elaboration.

EXAMPLE 3

A sheet having the thickness of 1.0 mm is produced by blending the compound A and calendering. Similarly, another sheet is prepared from the compound B. The former sheet comprising the compound A and the latter sheet comprising the compound B are laminated. The sheet obtained is applied on the kraft paper according to the same process as that of example 1 except that the temperature of heat treatment in an oven is set up at 180°C that is the decomposition temperature of the foaming agent and then the ornamental coating material having two layers, the upper layer of which has crack patterns formed therein and the lower layer of which becomes a foam. This product has the advantages of a light weight in spite of its thickness and a good touch.

EXAMPLE 4

Two sorts of resin compounds having different properties such as the compounds A and C or compounds C and D respectively are combined to make two sheets and the sheets obtained are laminated to each other and fed to the heated rolls according to the same process as that of Example 3 thereby causing differences in the internal strains of the sheets resulting in developing varied crack patterns.

EXAMPLE 5

A sheet having the thickness of 2.0 mm is produced by heating, and blending the compound A by means of the calender roll. On the other hand, a paste resin of the compound E is coated on the kraft paper in the thickness of 0.1 mm and passed through the oven at 180°C to gelatinize it. The gelatinized product is used as the backing material.

The backing material is applied on the sheet comprising the compound A and passed through between two heated rolls, and crack patterns can be produced according to the similar process to that of example 1. It is possible to use other plastic sol as the coating material. This method brings the advantages of attaining similar effects to those of examples 2, 3 and 4 in the single sheet as obtained according to the process of the example 1.

EXAMPLE 6

A sheet having the thickness of 2.0 mm is produced by blending the resin compound comprising the compound A using the mixing roll and the calender roll. The sheet obtained is applied on fabrics passed through between two heated rolls whereby crack patterns can be produced as those of example 1.

This product obtained shows the characteristic patterns by the combination of the crack patterns and fabric patterns appearing from the bottom of the cracks of the coated material, resulting in varied patterns different from the patterns obtained in the kraft paper as shown in the product of the example 1.

In this process, the variety can be effected by using the backing materials such as kraft paper, fabrics, non-woven fabrics, metallic foil (aluminum foil etc.), asbestos sheet and the like alone or in combination thereof respectively.

EXAMPLE 7

A sheet having the thickness of 3 mm is produced by calendering the compound A and pellets of about 100 square mm are produced by cutting the sheet. The pellets are scattered on the kraft paper passing between two heated rolls having the space of 0.5 mm and the temperatures of the upper roll of 80°C and the lower roll of 160°C respectively and after the compression, the product is passed through the oven at 140°C.

EXAMPLE 8

A amorphous compound heated at 90°C is produced by calendering the compound C using the mixing roll or the extruder. The compound is immediately applied on the backing material passing through between two heated rolls, the temperature of the lower roll being kept at 160°C, the temperature of the upper roll being kept at 60°C, the space between the two rolls is adjusted to 0.5 mm. The patterns obtained under said conditions show crack patterns together with flow patterns.

EXAMPLE 9

The compounding C is melted and molded to a round rod having the diameter of 3 mm using the extruder. The rod is cut in same length as the width of the kraft paper of the backing material and applied continuously on the kraft paper passing through between two rolls. The temperature of the lower roll is maintained at 170°C, while that of the upper roll is maintained at 100°C, and the space between the two rolls is adjusted to 0.5 mm. The round bar passes through between the two rolls having the compressive ratio of 6 to form a sheet and then the sheet is treated according to the same process as that of example 1. In this process, the coating material having colored strips varying in color in certain places can be obtained by changing the color of the round rods to be fed at certain periods.

EXAMPLE 10

Two sheets having 2.0 mm in thickness are made from the compounds F' and G' according to the process of the example 2 respectively, the sheet obtained are laminated on each other and fed on the kraft paper. The crack patterns can be obtained by the same process as that of example 1 under the condition that the rotation frequency of the rolls is specified to 3 m/min. If the rotation frequency is specified to 4 m/min., the crack patterns obtained are more coarse.

On the other hand, the lower surface of the piled two sheets is heated at 50°C, fed on the backing material and passed through between the two rolls to make the crack patterns finer.

In this example, when the tension in the back-ward direction is subjected to two sheets fed respectively, the supplying rate of the sheet can be adjusted whereby the uniformity and the reappearance of the crack patterns obtained can be ensured.

What is claimed is:

1. A process for producing an ornamental coating material having concavo-convex patterns, characterized by applying a thermoplastic resin sheet or a sheet formed from said resin having a thickness ($t$) of 0.8 - 10.0 mm to a backing material which is not deformed at a temperature higher than the softening point of said resin, said thermoplastic resin in the sheet forming stress patterns with a temperature differential of from about 20° C. to about 80° C. on opposite faces thereof, passing the resin sheet and the backing material product through between two rollers having a space distance ($d$) of 0.2 - 1.5 mm so as to obtain a compressive ratio of 3 - 30, the temperature of said roll contacted with the backing material being set in the range from the temperature of the softening point of the resin composition to a temperature higher than the softening point thereof by 50° - 60° C., while the temperature of said roll contacted with said resin being set at a temperature range of from lower than the softening point of the resin sheet by about 20° C. and the temperature of the softening point thereof.

2. A process as claimed in claim 1 and including the step of subsequently positively heating the laminate produced for at least 20 seconds at a temperature between the softening point of the resin and a temperature lower than the softening point of the resin by about 20° C.

3. A process as claimed in claim 1 therefrom which said thermoplastic resin sheet or a sheet formed thereform is manufactured from the resin selected from the group consisting of polyvinylchloride, vinylchloridevinyl acetate copolymer, vinylchloride-ethylene-vinylacetate copolymer, polyethylene, polypropylene, polystyrene and ethylene-vinylacetate copolymer.

4. A process as claimed in claim 1 in which the backing material is selected from the group consisting of a paper such as kraft paper, Japanese paper, various kinds of textiles, non-woven fabrics, metallic foil and synthetic resin sheet, asbestos sheet.

5. A process as claimed in claim 1 and including the steps of providing smooth peripheral surfaces on said two rollers, and setting up a controllable back tension on the product as fed to said two rollers.

* * * * *